(12) United States Patent
Nagl et al.

(10) Patent No.: US 7,144,447 B2
(45) Date of Patent: Dec. 5, 2006

(54) METHOD AND DEVICE FOR TREATING PARTICULATE MATERIAL

(75) Inventors: Michael Nagl, Reichenau (AT); Johannes Schenk, Linz (AT); Albert Zschetzsche, Ottensheim (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 49 days.

(21) Appl. No.: 10/481,619

(22) PCT Filed: May 28, 2002

(86) PCT No.: PCT/EP02/05856

§ 371 (c)(1),
(2), (4) Date: Feb. 17, 2004

(87) PCT Pub. No.: WO02/103063

PCT Pub. Date: Dec. 27, 2002

(65) Prior Publication Data

US 2004/0231514 A1 Nov. 25, 2004

(30) Foreign Application Priority Data

Jun. 19, 2001 (AT) .................................. A 948/01
Jun. 19, 2001 (AT) .................................. A 949/01

(51) Int. Cl.
*B01D 45/12* (2006.01)
*F27D 23/02* (2006.01)

(52) U.S. Cl. .................... 95/271; 96/373; 55/459.1; 422/145

(58) Field of Classification Search ............. 95/269, 95/271; 96/373; 55/459.1; 422/139, 144, 422/145, 147; 134/7; 75/444; 266/172
See application file for complete search history.

(56) References Cited

U.S. PATENT DOCUMENTS

| 1,954,352 | A | * | 4/1934 | Dornbrook et al. ......... 202/108 |
| 2,973,260 | A | * | 2/1961 | Nogiwa ....................... 75/453 |
| 3,320,050 | A | | 5/1967 | Mayer et al. |

(Continued)

FOREIGN PATENT DOCUMENTS

AT 405 521 B 9/1999

(Continued)

OTHER PUBLICATIONS

Abstract of Japanese Publication No. 01242708, published Sep. 27, 1989.

*Primary Examiner*—Frank M. Lawrence
(74) *Attorney, Agent, or Firm*—Ostrolenk, Faber, Gerb & Soffen, LLP

(57) ABSTRACT

A process and apparatus for reducing material in particle form in a fluidization zone and at elevated temperature, in particular for reducing fine ore, the particle material being held in the fluidization zone by a treatment gas which flows upward from below. Material in fine particle form is discharged from the fluidization zone with the treatment gas and is separated out of the treatment gas in a deposition zone. In the deposition zone, the stream of treatment gas and discharged material in fine particle form are fed into a separating device which removes the fine particle material from the treatment gas, the treatment gas is extracted from the separating device as off-gas, and the separated fine particle material is removed from the separating device. Coarse-grained material is then introduced into the deposition zone. This reduces the levels of caking and deposits of the fine particle material. A device for carrying out the process includes elements defining the zones.

38 Claims, 7 Drawing Sheets

U.S. PATENT DOCUMENTS

| | | |
|---|---|---|
| 3,393,066 A | 7/1968 | Mayer |
| 3,951,646 A | 4/1976 | Hamada et al. |
| 4,725,409 A * | 2/1988 | Wolf ........................ 422/145 |
| 5,074,530 A * | 12/1991 | Iwasaki et al. ............. 266/157 |
| 5,177,292 A * | 1/1993 | Lenglet ...................... 585/648 |
| 5,198,019 A | 3/1993 | Dry et al. |
| 5,407,179 A | 4/1995 | Whipp |
| 5,447,571 A * | 9/1995 | Kuchner et al. ................ 134/7 |
| 6,241,801 B1 | 6/2001 | Kepplinger et al. |

FOREIGN PATENT DOCUMENTS

| | | |
|---|---|---|
| DE | 1 272 324 | 7/1968 |
| DE | 3 919 715 C1 | 9/1990 |
| DE | 4 030 792 A1 | 4/1992 |
| EP | 0 643 141 A1 | 3/1995 |
| EP | 1 023 932 A1 | 8/2000 |
| GB | 2 140 144 A | 11/1984 |
| JP | 01-242708 A * | 9/1989 |

* cited by examiner

METHOD AND DEVICE FOR TREATING PARTICULATE MATERIAL

BACKGROUND OF THE INVENTION

The invention relates to a process for treating, preferably for reducing, material in particle form in at least one fluidization zone at elevated temperature, in particular for reducing fine ore, the particulate material being held in the fluidization zone by a treatment gas which flows upward from below. Material in fine particle form which is discharged from the fluidization zone with the treatment gas is separated out of the treatment gas in a deposition zone. The following steps are carried out in the deposition zone: feeding the stream of treatment gas and discharged material in fine particle form to a separating device, separating the finely particulate material from the treatment gas, the treatment gas being extracted from the separating device as off-gas, and removing the separated finely particulate material from the separating device, and to an apparatus for carrying out the process.

In fluidized-bed systems, the separation of material in fine particle form, i.e. fine dust, which is discharged or entrained from the fluidization zone with the treatment gas, is of considerable importance.

It is desirable for the fine dust to be separated from the treatment gas as completely as possible, in order on the one hand to avoid loss of material and in order on the other hand to avoid caking originating from the fine dust carried in the treatment gas in a further process, in which the off-gas extracted from the separating device is generally once again used as a treatment gas.

Fine dust has poor flow properties in particular in the hot state and tends to cause blockages and caking in cyclone outlets and inlets. In extreme cases, fine-dust return lines may even become blocked up.

SUMMARY OF THE INVENTION

Therefore, the object of the present invention is to provide a process which avoids the problems outlined above. In particular, it is intended to reduce or prevent caking and blockages in the separating device and lines which supply the separating device or lead away from it.

In the invention, this object is achieved by introducing a coarse-grained material into the deposition zone in addition to the stream of treatment gas and discharged finely particulate material.

The addition of coarse-grained material to the deposition zone improves the flow properties of the fine dust, i.e. reduces its caking tendency. It is even possible to reduce the extent of existing caking on account of a cleaning effect which occurs during the addition of the coarse-grained material.

In an advantageous embodiment of the process of the invention, coarse-grained material having a temperature at least 200° C. below the temperature of the treatment gas and below the temperature of the finely particulate material is used.

Since part of the caking tendency originates from the high temperature of the treatment gas and therefore of the finely particulate material, it is advantageous if the temperature of the coarse-grained material is well below the temperature of the finely particulate material.

In this case, it is particularly preferable for the temperature of the coarse-grained material to be substantially ambient temperature.

This allows the maximum possible temperature difference between finely particulate material and coarse-grained material to be utilized, in order to improve the flow properties of the finely particulate material.

In a further embodiment of the process of the invention, the coarse-grained material is introduced into the stream of the treatment gas which is to be fed to the separating device.

Furthermore, it is advantageous if, in addition or as an alternative, coarse-grained material is introduced into the separating device itself.

Furthermore, it is advantageous if, in addition or as an alternative to the embodiments described above, coarse-grained material is added to the finely particulate material which is removed from the separating device.

This has proven advantageous in particular if the separated finely particulate material is fed to a further fluidization zone.

The location where the coarse-grained material is added can be varied as required in the process, although simultaneous addition of coarse-grained material at all the positions listed above is also possible.

In particular, it is also possible to vary the addition of the coarse-grained material in terms of time, for example for it to be added continuously or intermittently.

In a preferred variant, the coarse-grained material is added pneumatically with the aid of a carrier gas.

In this case, it is particularly advantageous if the carrier gas is chemically inert with respect to the treatment gas or is substantially to completely identical to the treatment gas. For example, if the treatment gas is a reduction gas which contains CO and $H_2$, the carrier gas is preferably likewise a reduction gas which contains CO and $H_2$, particularly preferably a gas of this type having the same composition. However, at the least the carrier gas used is an inert gas, for example nitrogen.

The pneumatic addition of the coarse-grained material makes its abrasive action particularly pronounced, meaning that it is not necessary for coarse-grained material to be added continuously, and periodic addition, for example pulsed addition, is sufficient.

In a further feature of the process of the invention, the coarse-grained material is added using the force of gravity.

In this case, the coarse-grained material is, for example, introduced into a solids lock and then introduced into the separating device under the force of gravity.

Of course, it is advantageous if the coarse-grained material has a substantially similar composition to the particulate material which has been treated in the fluidization zone or if the coarse-grained material has a composition which allows the coarse-grained material to be processed further, in a process step which follows the fluidization zone, together with the particulate material.

Therefore, in the case of the reduction of fine ore, the coarse-grained material is advantageously formed by ore and/or additives, such as lime, dolomite or MgO.

The invention also relates to an apparatus having at least one fluidized-bed reactor with a lower part, which accommodates the fluidization zone, and with an upper part, which is connected to a deposition device. A deposition device is formed by a separating device, preferably a cyclone, in which material in fine particle form can be separated from the treatment gas. A means feeds treatment gas and material in fine particle form into the separating device. A treatment-gas discharge line leads out of the separating device. A solids discharge line leads out of the separating device.

The object of this aspect of the invention is to provide an apparatus in which caking and blockages on or in the deposition device are avoided or reduced.

This object is achieved by providing the deposition device with means for feeding coarse-grained material into the deposition device.

The means for feeding treatment gas and finely particulate material into the separating device is designed as a function of the spatial arrangement of the fluidized-bed reactor and of the deposition device and of the spatial distance between them. It comprises, for example, an inlet opening (in the case of an internally located cyclone), a pipeline (in the case of an externally located cyclone a short distance away) or a pneumatic conveying line (if there is a relatively great distance between fluidized-bed reactor and cyclone).

The separating device is preferably designed as a cyclone, since this is by far the most common application.

In an expedient embodiment, the means for supplying coarse-grained material comprises a lance which opens out into the interior of the separating device in such a manner that coarse-grained material can be introduced into the interior of the separating device.

In a further embodiment of the apparatus of the invention, the means for supplying coarse-grained material is connected to the means for supplying treatment gas in such a manner that coarse-grained material can be introduced into the stream of finely particulate material which is entrained with the treatment gas.

Another possible way of introducing coarse-grained material into the separating device is providing at least one additional inlet opening on the separating device, through which the coarse-grained material can be introduced into the separating device by the means for supplying coarse-grained material.

When the separating device is a cyclone, an additional inlet opening is advantageously arranged in such a manner that coarse-grained material can be introduced into the cyclone substantially tangentially by the means for supplying coarse-grained material.

A tangential supply of the coarse-grained material results in the minimum interference with the deposition efficiency of the cyclone.

In a further advantageous embodiment, an additional inlet opening is arranged in such a manner that coarse-grained material can be introduced into the separating device from above by the means for supplying coarse-grained material.

A further configuration of the invention comprises the means for supplying coarse-grained material being connected to the solids discharge line in such a manner that coarse-grained material can be introduced into the stream of finely particulate material which has been separated out in the separating device.

This reduces or prevents caking and deposits in the solids discharge line which connects the separating device to downstream parts of the installation, e.g. a further fluidized-bed reactor.

The apparatus of the invention may in principle be equipped with either an internal separating device or an external separating device, with the solids discharge line from an external separating device leading back either into the same fluidized-bed reactor (circulating fluidized bed) or into a further fluidized-bed reactor.

In the case of an internal separating device, the treatment gas discharge line leads outside the fluidized-bed reactor, and the solids discharge line opens out into the fluidization zone of the same fluidized-bed reactor.

In one feature of the apparatus of the invention, the means for supplying coarse-grained material is designed as a pneumatic feed device.

The invention also relates to an apparatus and a process for cleaning dust-laden gas in a separation chamber, in particular a cyclone, preferably by means of centrifugal-force deposition. The dust-laden gas flows into the separation chamber via an opening. The at least partially cleaned gas is discharged again, preferably flowing out from the separation chamber via a line, for example, via a submerged pipe. Furthermore, the invention relates to a process for reducing the amount of gas which flows out of a separation chamber, in particular a cyclone. Solids are separated out of a gas, preferably by centrifugal-force deposition. The at least partially cleaned gas is removed via at least one removal line. As a result the of at least partial blockage by the deposited solids, the separation chamber has a deposition capacity which is lowered, in particular compared to standard operation.

Centrifugal-force deposition means is used as a general term to encompass equipment in which centrifugal force is utilized to deposit solids, for example dust, out of gases. In operational practice, in particular at high operating temperatures, i.e. during the cleaning of hot dust-containing off-gas, the occurrence of caking is observed in the cyclone. Caking of this type, in particular at the underflow of the centrifugal-force deposition means, cannot always be prevented altogether, and consequently suitable measures have to be taken in the event of caking occurring, with the subsequent adverse effect on operation.

If the caking causes the centrifugal-force deposition means to become blocked and therefore the deposition capacity to become unsatisfactory, it is customary to block off the line for removing the gas, which is now only being insufficiently cleaned in the deposition means, using a suitable shut-off device, which is preferably of mechanical design. This makes it possible to prevent the insufficiently cleaned gas from escaping into downstream installations or into the environment. Both these possibilities would have corresponding drawbacks.

However, in particular at high temperatures, mechanical shut-off devices of this type are susceptible to faults and require regular and intensive maintenance. Finally, corresponding functional designs of shut-off devices of this type are also very expensive to procure.

The present invention is therefore based on the object of overcoming the drawbacks of the prior art and developing a simple and economic process, and a suitable apparatus, preferably for carrying out the process.

The embodiments of the invention are generally based, for example, on a centrifugal-force deposition means, in particular a cyclone, but the processes of the invention or the apparatus of the invention are not restricted to these specific designs.

Feeding the coarse bulk material into the separation chamber prevents or reduces caking and/or encrustation which forms in the separation chamber and/or in the region of the separation chamber, for example at the transition from the cone to the, preferably cylindrical, material outlet line of a cyclone, and/or causes caking which has already formed to be effectively at least partially removed.

In a particular embodiment of the invention, the caking is abraded and/or knocked off, in particular by mechanical action.

In a particular embodiment of the process of the invention, coarse bulk material is fed into the separation chamber in a predetermined grain size, composition and/or amount at which the occurrence of caking in the separation chamber is reduced and/or caking which has already occurred is at least partially removed.

The coarse bulk material is preferably introduced via the line for discharging the at least partially cleaned gas.

In a further embodiment, the coarse bulk material is introduced directly into the separation chamber.

In yet another embodiment of the process of the invention, the coarse bulk material is fed into the separation chamber together with the dust-laden gas which is to be cleaned.

For the cleaning action of the bulk material, in particular in the separation chamber and/or the material outlet line, to be successful, it is essential for the bulk-material particles to have a sufficient kinetic energy. Accordingly, for example when the bulk material is supplied together with the dust-laden gas, a suitable way of allowing them to take up kinetic energy, preferably a suitable drop, has to be provided in the centrifugal-force deposition means.

In one embodiment of the process of the invention, the coarse bulk material has a mean grain size which at least partially prevents undesired discharge of the coarse bulk material from the separation chamber, in particular via the line for removing the at least partially cleaned gas.

In one embodiment of the process of the invention, before the coarse bulk material is introduced into the separation chamber, the material is prepared so as to have a mean grain size which reduces, in particular prevents, the discharge of the bulk material via the line for removing the at least partially cleaned gas. The required grain size in this case is dependent on the construction of the separation chamber and on the flow conditions in the separation chamber and/or the line for removing the at least partially cleaned gas.

When the material outlet is laid in a separation chamber, in particular a cyclone, it is filled with the deposited solids up to just below the line for removing the at least partially treated gas, in particular the submerged pipe, so that the solids-laden gas can flow from the inlet to the submerged pipe and conveys the solids to be deposited away through the line, in particular the submerged pipe. Although this therefore eliminates the function of the cyclone, the gas stream from which dust has not been removed does not come to a standstill and may even—depending on the flow resistances—rise compared to, for example, separation chambers functioning in parallel.

Therefore, it is recommended to block off the adversely affected cyclone.

In the prior art, mechanical slides would be installed in the gas-removing lines. Given the conditions which are present, such slides are very expensive, complex and susceptible to faults, and depending on the guidance of the pipes also considerably increase the size of the built-up space.

In a preferred embodiment of the invention, this problem can be solved considerably more neatly by a material-introduction connection piece with a nominal width of approx. 200 mm, for example, which is preferably closed off by a ball valve, preferably being arranged in the gas line which leads out. This ball valve can be designed for low temperatures by having a gentle purging flow and generally functions without faults.

In a particular embodiment, if a cyclone has become blocked, a vessel with a tap is fitted onto the ball valve and flanged into place. This vessel is filled with relatively coarse bulk material—e.g. screened ore. The ball valve is then opened and the bulk material fills the space which remains up to the submerged pipe, as well as part of the submerged pipe itself. The dust-laden gas would then have to flow through this bulk material, so that the flow comes to a standstill in no time. In this case, in an additional feature of the invention, the initial flow of the dust-laden gas, on account of the flow effect, causes the spaces within the coarse bulk material to be filled up by the fine dust which is carried, so that ultimately the bulk material bed is at least partially sealed off. This effectively blocks off the cyclone.

In one embodiment of the process of the invention, the gas in the separation chamber is at least partially prevented from leaving the separation chamber via the line for removing the at least partially treated gas by a bed of bulk material which is caused by the introduction of the coarse bulk material.

In one embodiment of the process of the invention, the coarse bulk material has a mean grain diameter which at least partially prevents discharge via the gas flow out of the separation chamber, preferably out of the separation chamber itself, in particular via the line for removing the at least partially cleaned gas.

In one embodiment of the process of the invention, before it is introduced into the separation chamber, the coarse bulk material is treated in such a manner that the coarse bulk material has a mean grain diameter which reduces, in particular prevents, the discharge of the bulk material via the line for removing the at least partially cleaned gas. The grain size required is in this case dependent on the construction of the separation chamber and on the flow conditions in the separation chamber and/or the line for removing the at least partially cleaned gas.

A filling connection piece in this case preferably represents a device via which the coarse bulk material can be introduced into the line for removing the gas which has been at least partially cleaned in the separation chamber in normal operation.

In a particular embodiment of the apparatus of the invention, a filter and/or a grate, which can separate the coarse bulk material from the deposited dusts, is provided downstream of the separation chamber, in particular beneath the separation chamber.

In a further embodiment of the apparatus of the invention, a device for extracting the coarse bulk material, if appropriate from the filter and/or the grate, is arranged downstream of the separation chamber, in particular beneath the separation chamber.

In a further embodiment of the apparatus of the invention, the coarse bulk material can be recycled and, for example in the manner described, introduced back into the separation chamber and/or the line for removing the at least partially cleaned gas.

In an additional embodiment of the apparatus of the invention, the filling connection piece is provided as part of a device for the metered supply of the coarse bulk material. The device also has a controllable lock or a controllable star feeder or another component for the metered supply of the bulk material.

In a particular embodiment of the apparatus of the invention, the device for controlled supply has a vessel which can be coupled to the filling connection piece.

In various embodiments of the apparatus of the invention, the following devices are provided for the, in particular controlled, supply of coarse bulk material:

line having a lock, in particular a star feeder, which allows the bulk material to be supplied either continuously or batchwise vessel which is provided either in a fixed position or variably (such that it can be attached and removed), once again with a corresponding lock, in particular a star feeder.

The process of the invention and the apparatus of the invention are particularly preferably suitable for use in metallurgy, since this technology often involves working with dust-laden, hot gases which have to be cleaned. The processes and the apparatus of the invention are particularly preferably used to clean the reduction gas, in particular from a fluidized-bed process, preferably used in metallurgical reduction technology.

The processes and the apparatus of the invention are also suitable for use in particular in installations and processes used in the nonferrous metals industry or the non-metals industry, for example in cement production and/or cement processing.

BRIEF DESCRIPTION OF THE DRAWINGS

The processes of the invention and the apparatus of the invention are explained in more detail below, by way of example with reference to a number of non-restrictive drawings, in which.

DETAILED DESCRIPTION OF PREFERRED EMBODIMENTS OF THE INVENTION

Figure 1:
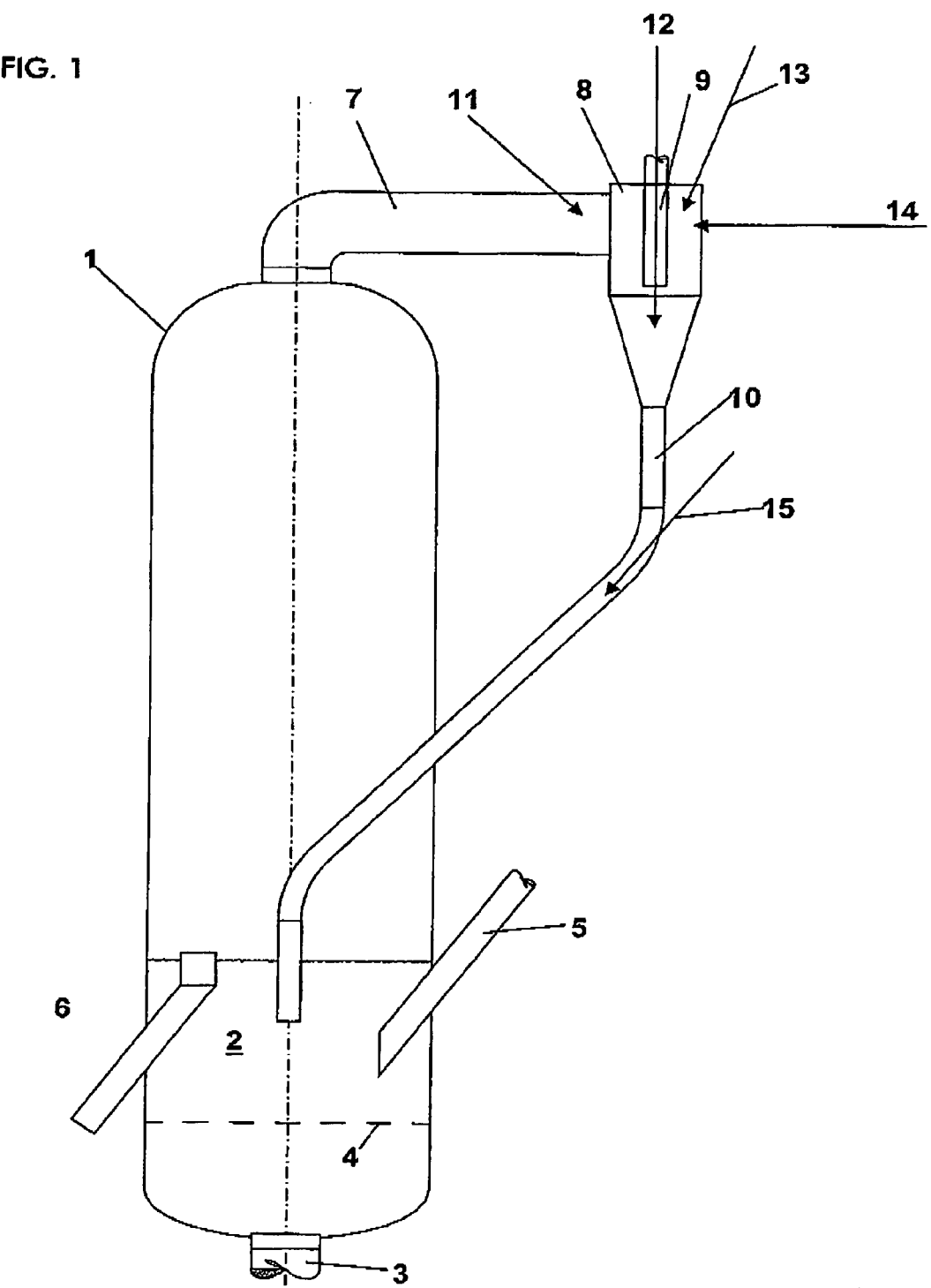
FIG. 1 shows an embodiment of a process of the invention for treating, preferably for reducing, material in particulate form, and a suitable apparatus for carrying out the process.

FIG. 1 shows a fluidized-bed reactor 1, including a lower part which includes a fluidization zone 2. Treatment gas is fed to the fluidized-bed reactor 1 from below through a treatment-gas feed line 3. The treatment gas is distributed uniformly via a gas-distribution base 4, which may be designed, for example, as a nozzle grate, with material in particle form also being fluidized in the fluidization zone 2.

The reactor 1 is provided with feed and discharge lines 5, 6 for particulate material and with a discharge line 7 which simultaneously forms the means 7 for feeding treatment gas and material in fine particle form into the separating device.

The separating device 8 is designed as a cyclone and has a treatment-gas discharge line 9 and a solids discharge line 10. The solids discharge line 10 opens out into the fluidized-bed reactor 1 or into the fluidization zone 2.

Arrows 11, 12, 13, 14, 15 diagrammatically depict a plurality of means for feeding coarse-grained material into the deposition device, or the locations where these means may be arranged.

Coarse-grained material is introduced into the treatment-gas supply 7 by the means 11, and coarse-grained material is introduced into the cyclone by the means 12, 13, 14, the means 12 partially passing through the treatment-gas discharge line 9 and opening out into the interior of the cyclone.

Coarse-grained material is introduced directly into the interior of the cyclone via the means 13, 14, specifically from above through an additional introduction opening (not shown) in the case of 13 and substantially tangentially with respect to the cyclone 8 in the case of 14.

Coarse-grained material is introduced into the solids discharge line 10, which leads away from the cyclone 8, through the means 15.

Each of the means 11, 12, 13, 14, 15 is preferably designed as a pneumatic feed device, although addition under the force of gravity is equally possible.

Figure 2:
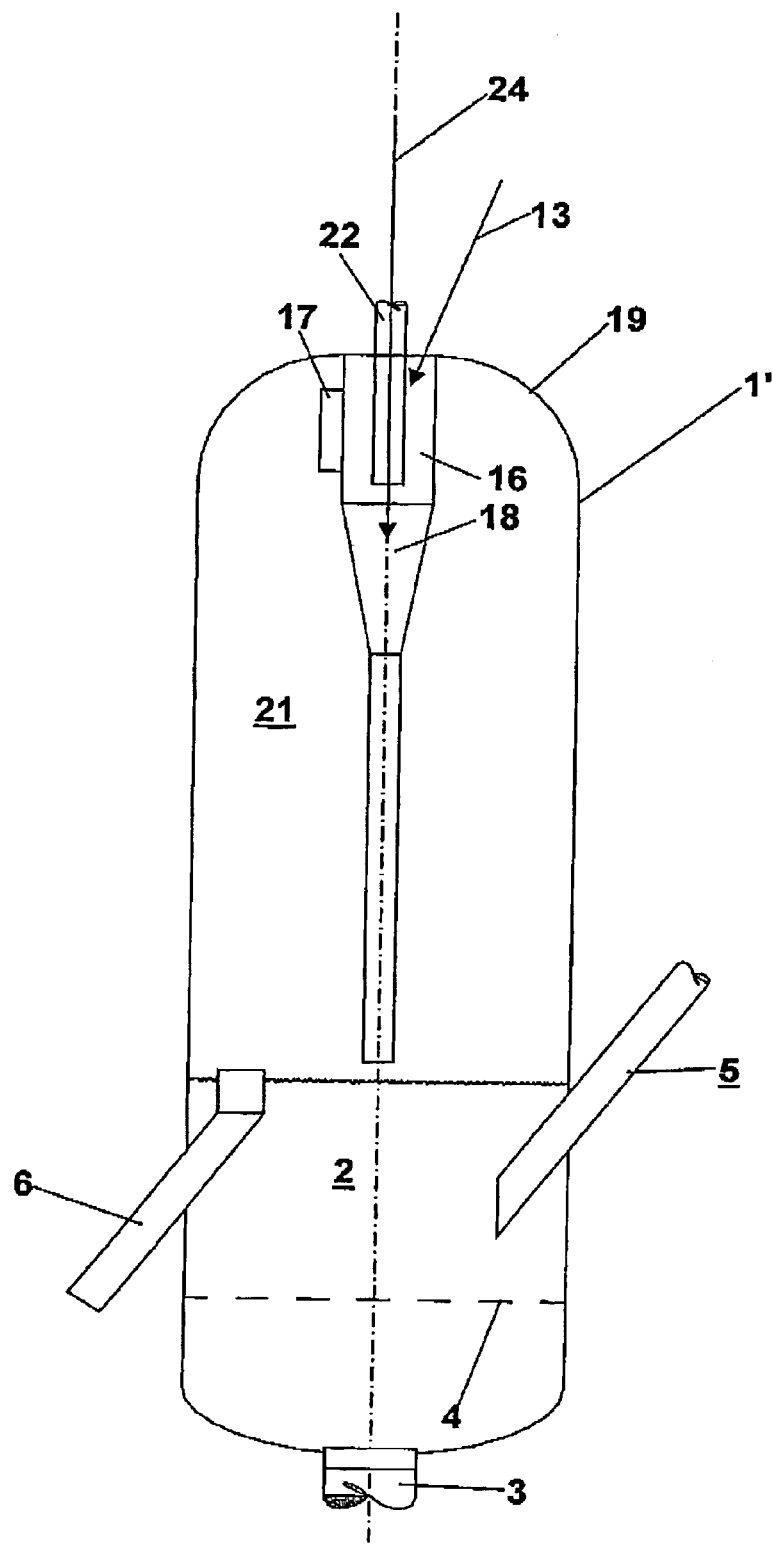
FIG. 2 shows a further embodiment of the process as claimed in the invention for treating, preferably for reducing, material in particle form, as well as a suitable apparatus for carrying out the process.

FIG. 2 shows a fluidized-bed reactor 1', the lower part of which includes a fluidization zone 2. Treatment gas is fed to the fluidized-bed reactor 1' from below through a treatment gas feed line 3. The treatment gas is distributed uniformly via a gas-distribution base 4, which may be designed, for example, as a nozzle grate, with particulate material also being fluidized in the fluidization zone 2.

The reactor 1 is equipped with feed and discharge lines 5, 6 for particulate material. Instead of an external cyclone 8, the fluidized-bed reactor 1' is equipped with an internal cyclone 16, in which the means 17 for supplying treatment gas is formed by an inlet opening 17 and from which a solids discharge line 18 leads away, opening out into the fluidization zone 2.

A treatment-gas discharge line 19, through which treatment gas is carried away from the fluidized-bed reactor 1', leads away from the cyclone 16.

Arrows 12, 13 diagrammatically indicate means 12, 13 for feeding coarse-grained material into the cyclone 16, the means 12 partially passing through the treatment-gas discharge line 19, and the means 13 opening into the interior of the cyclone from above through an additional introduction opening (not shown).

Figure 3:
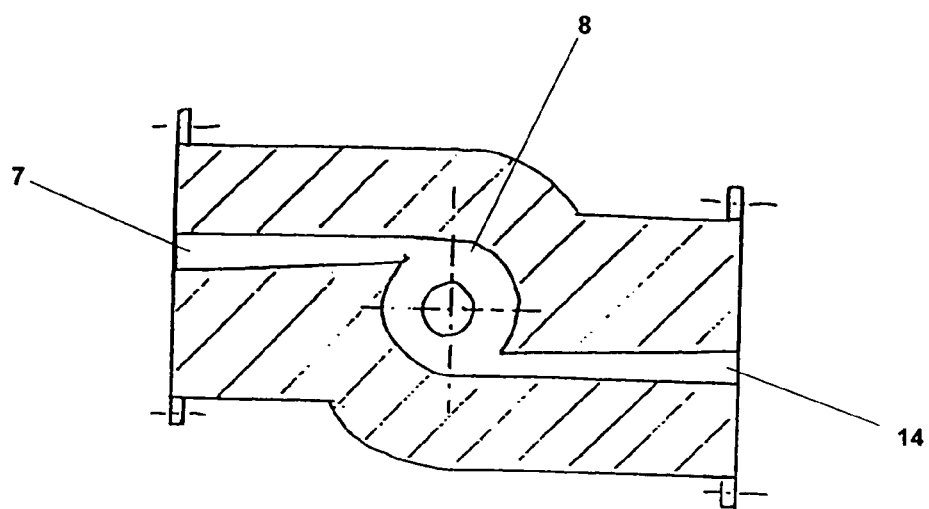
FIG. 3 shows a vertical cross section through a deposition device.

FIG. 3 illustrates a horizontal cross section through a cyclone 8. Both the treatment-gas feed 7 and the means 14 for supplying coarse-grained material open out approximately tangentially—with respect to the cyclone 8—and horizontally into the cyclone.

Figure 4A:
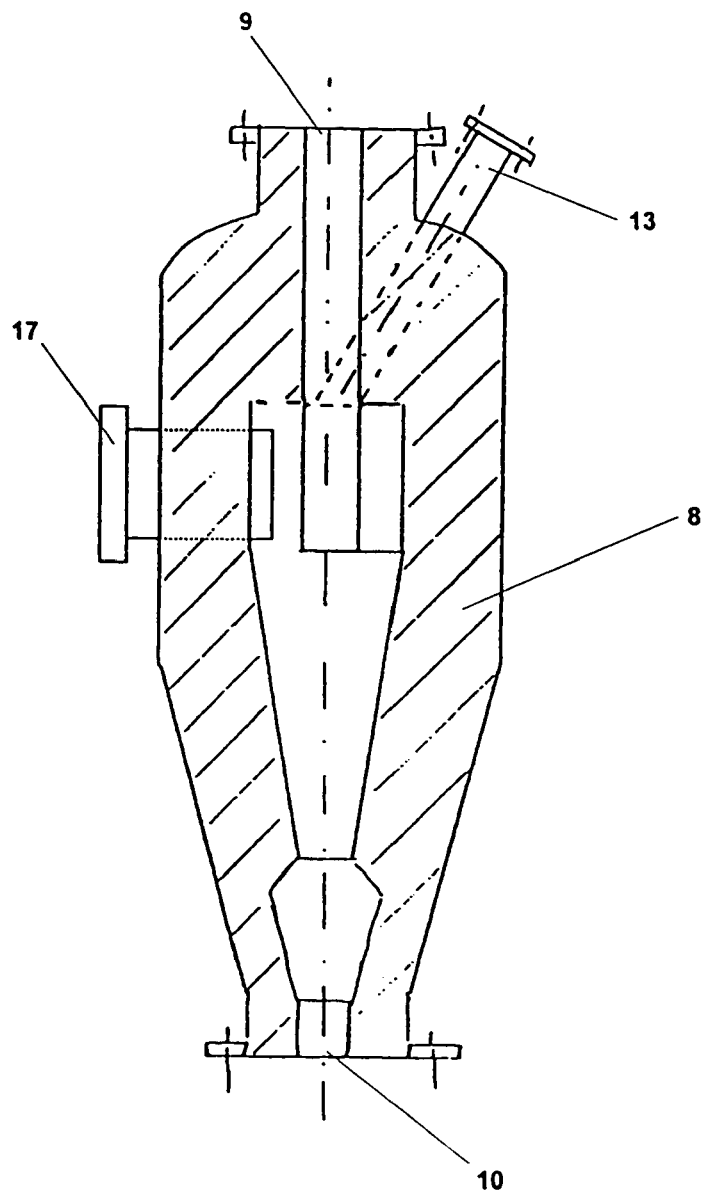
FIGS. 4A and 4B show a deposition device in vertical section and horizontal section.

FIG. 4A shows a vertical cross section through a cyclone 8 with treatment-gas discharge line 9 and solids discharge line 10. A means 17 for supplying treatment gas is designed as a laterally arranged inlet opening.

A means 13 for supplying coarse-grained material leads obliquely from above through the cyclone cover.

Figure 4B:
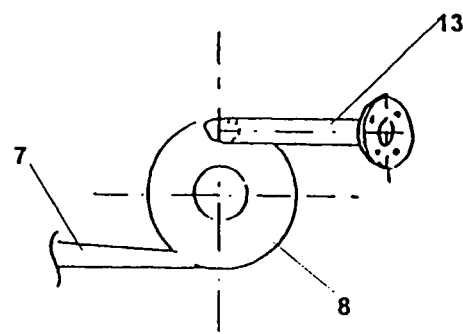

FIG. 4B shows the same cyclone 8 as FIG. 4A in a horizontal cross section. It can be seen that both the treatment-gas feed 7 and the means 13 for supplying coarse-grained material open substantially tangentially into the cyclone 8.

Figure 5:
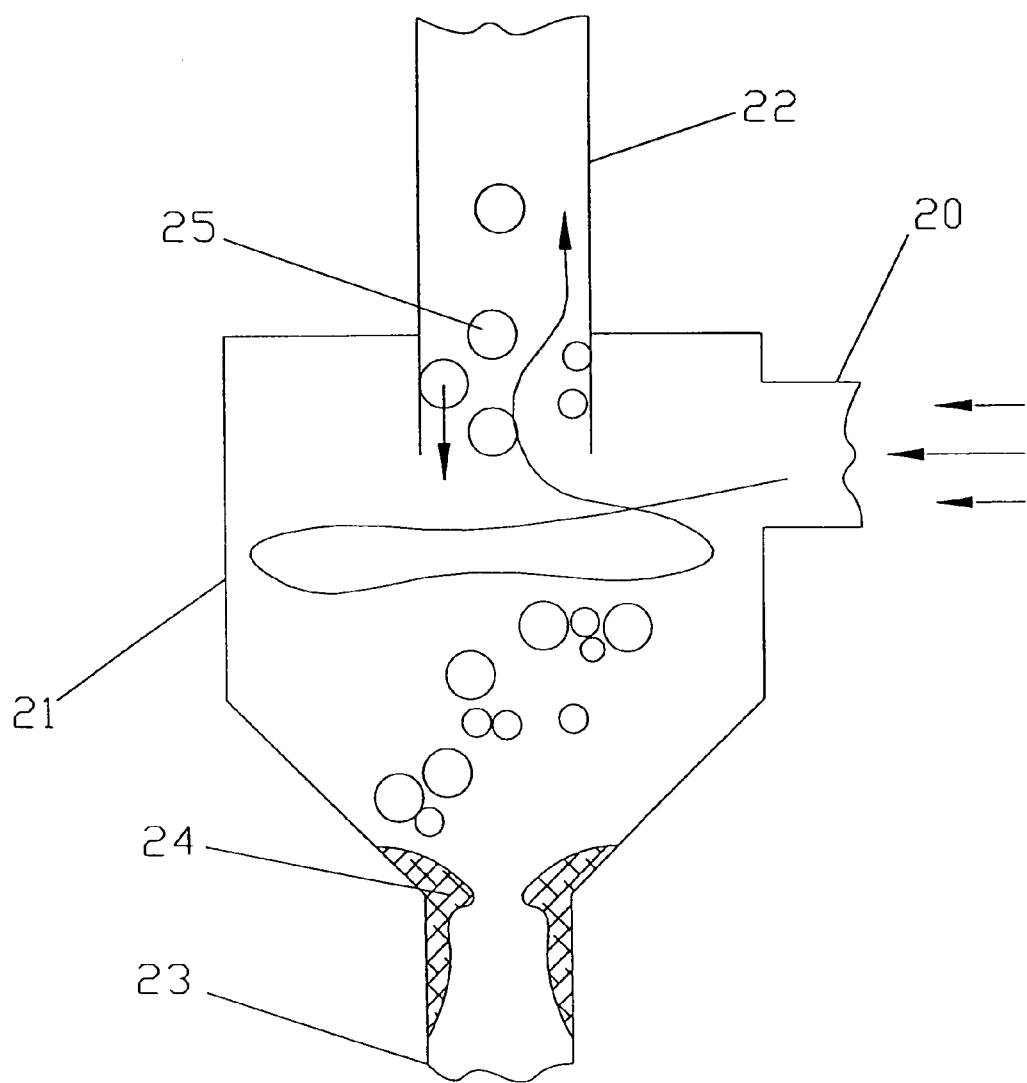
FIG. 5 shows an exemplary embodiment of a process and an apparatus for cleaning a dust-laden gas.

In accordance with FIG. 5, dust-laden gas is introduced via an inlet 20 into a cyclone 21, in which dust is at least partially removed from it. The cleaned gas is discharged from the separation chamber via a submerged pipe 22. The residues which have been separated off, in particular the dust which has been separated off, is discharged via an outlet pipe 23 for further utilization. Particularly in the case of hot dust-containing gas, the deposited dust tends to form caking 24, which in one embodiment of the process of the invention is removed by coarse bulk material 25 which is introduced, for example, via the submerged pipe.

Figure 6:
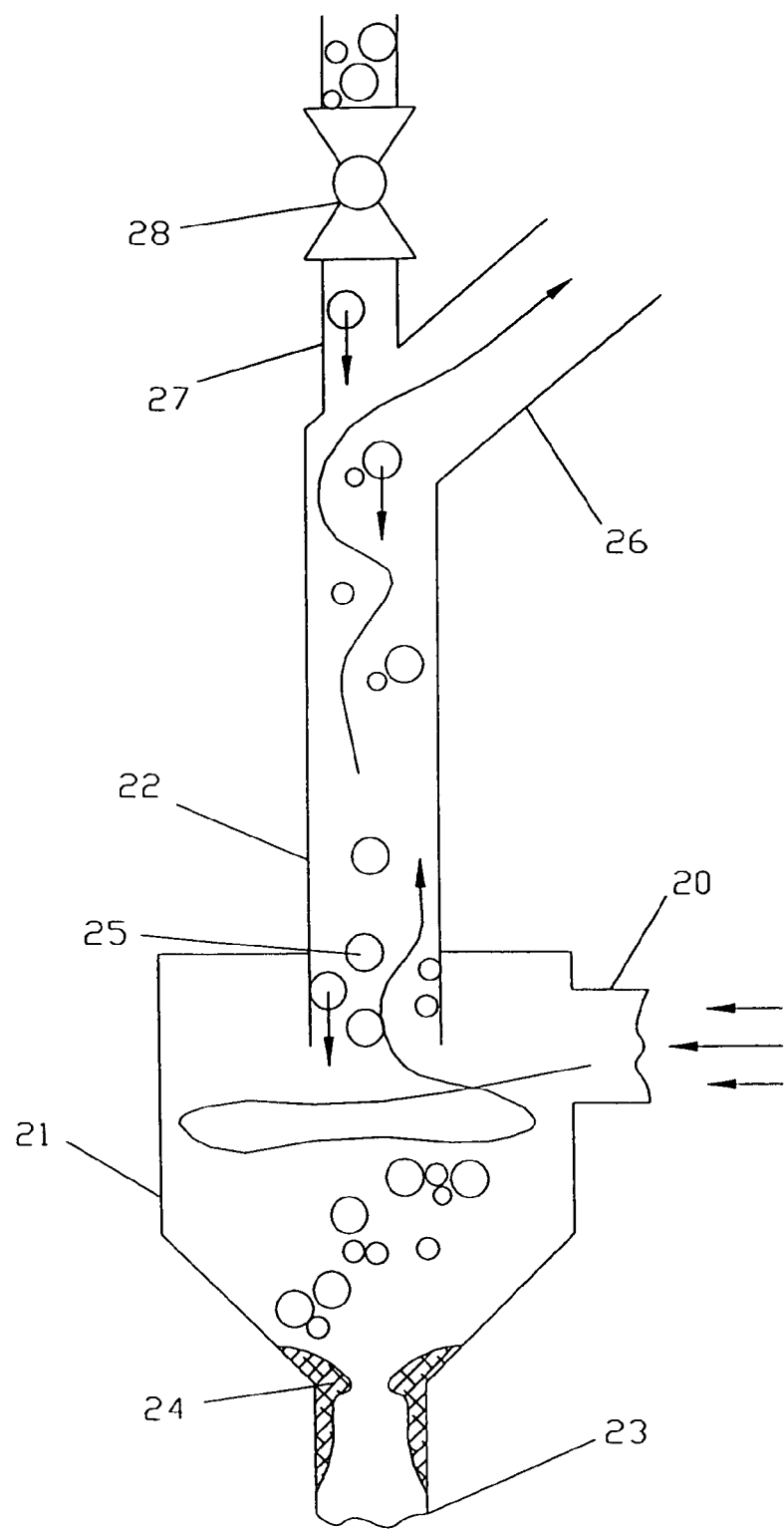
FIG. 6 shows an exemplary embodiment of a process and an apparatus for cleaning a dust-laden gas, as well as a way of introducing the coarse bulk material.

FIG. 6 shows a detailed view of the introduction of the coarse bulk material into the submerged pipe 22 in accordance with a particular embodiment of the process of the invention. Accordingly, the cleaned gas is discharged from the separation chamber 21 via a gas line 26. A connection piece 27 opens out into the gas line 26 above the separation chamber, and the coarse bulk material is introduced through this connection piece, in particular via a ball valve 28.

Figure 7:
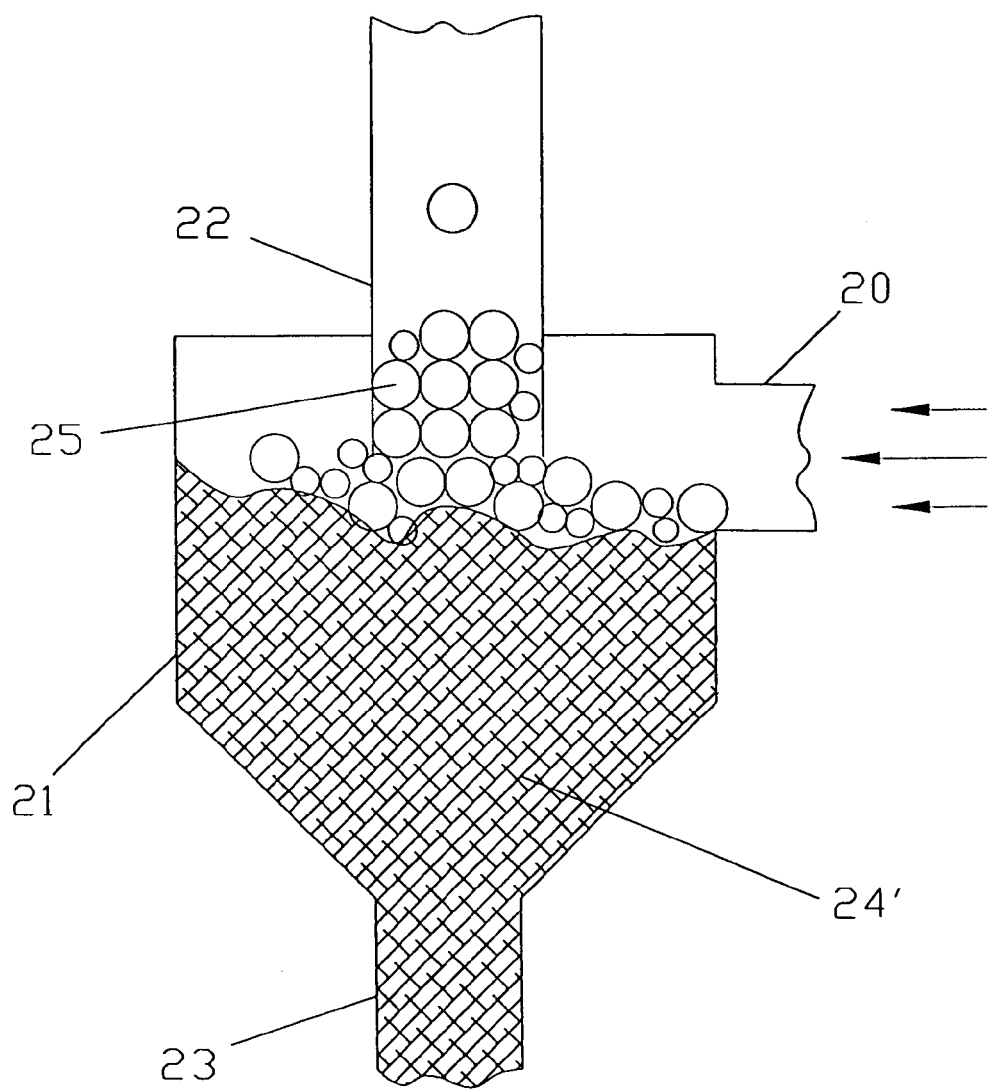
FIG. 7 shows a process for minimizing the amount of gas which flows out of a separation chamber for separating solids out of gases.

Finally, FIG. 7 shows the situation in which the separation chamber 21 has become blocked by the hot dust 24' and it is no longer possible for any significant amounts of the dust to be removed. Of course, in this situation, gas, which has now not been cleaned, could continue to flow out of the separation chamber into the submerged pipe 22, having an adverse effect on the further process. To prevent this, in the invention it is proposed for coarse bulk material 25 to be introduced into the submerged pipe and in this way to close off the submerged pipe or the cyclone in a substantially gas tight manner.

The invention claimed is:

1. A process for reducing material in particle form in a fluidization zone at elevated temperature, the method comprising:
   holding the material in particle form in the fluidization zone by flowing a treatment gas upward from below the fluidization zone into the fluidization zone;
   discharging a stream of treatment gas from the fluidization zone with material in fine particle form entrained therein;
   feeding the stream of treatment gas and entrained material in fine particle form to a separating unit;
   separating the fine particle material from the treatment gas in the separating unit;
   extracting the separated treatment gas from the separating unit as off-gas and delivering the separated fine particle material to a solids discharge line; and
   introducing a coarse-grained material at one or more locations in the flow path of the treatment gas and/or fine particle material from the fluidization zone such that the coarse-grained material and the discharged fine particle material travel together in the solids discharge line.

2. The process as claimed in claim 1, further comprising controlling the temperature of the coarse-grained material to be at least 200° C. below the temperature of the treatment gas and of the temperature of the fine particulate material.

3. The process as claimed in claim 2, further comprising controlling the temperature of the coarse-grained material to be substantially at ambient temperature.

4. The process as claimed in claim 2, wherein the coarse-grained material is introduced into the stream of the fine particle material upstream of the separation unit so that the stream of the coarse-grained material is entrained with the treatment gas.

5. The process as claimed in claim 1, further comprising introducing the coarse-grained material into the separation unit.

6. The process as claimed in claim 1, further comprising adding coarse-grained material to the fine particle material in the solids discharge line.

7. The process as claimed in claim 1, further comprising introducing the coarse-grained material pneumatically with the aid of a carrier gas.

8. The process as claimed in claim 1, further comprising introducing the coarse-grained material by gravity.

9. The process as claimed in claim 1, wherein the coarse-grained material comprises at least one of ore to be reduced and additives for the ore.

10. Apparatus for reduction treatment of material in particle form, the apparatus comprising:
    a fluidized-bed reactor having an upper part and having a lower part, and a fluidization zone in the lower part;
    a deposition device connected to the fluidization zone the deposition device comprising a separating device in which material in fine particle form can be separated from a treatment gas;
    a feeder for feeding treatment gas and material in fine particle form into the separating device;
    a treatment gas discharge line, which leads out of the separating device; and a solids particle discharge line which leads out of the separating device;
    a feed device for feeding coarse-grained material into the deposition device; and
    an additional inlet opening into the separating device for introducing coarse-grained material fed by the feed device,
    the additional opening being arranged such that coarse-grained material can be introduced into the separating device from above by the feed device.

11. The apparatus as claimed in claim 10, wherein the feed device for coarse-grained material comprises a lance which opens out into the interior of the separating device for introducing coarse-grained material into the interior of the separating device.

12. The apparatus as claimed in claim 10, wherein the feed device for coarse-grained material is connected to the feeder for supplying treatment gas such that coarse-grained material can be introduced into the stream of fine particle material which is entrained with the treatment gas.

13. The apparatus as claimed in claim 10, wherein the separating device comprises a cyclone, and the additional inlet opening is arranged such that coarse-grained material can be introduced into the cyclone substantially tangentially by the feed device.

14. The apparatus as claimed in claim 10, wherein the feed device for supplying coarse-grained material is connected to the solids particle discharge line for introducing coarse-grained material into a stream of fine particle material which has been separated out in the separating device.

15. The apparatus as claimed in claim 10, wherein the deposition device is arranged outside the fluidized-bed reactor, and comprising a further fluidized-bed reactor into which the solids particle discharge line opens out.

16. The apparatus as claimed in claim 10, wherein the deposition device is arranged inside the fluidized-bed reactor, the treatment-gas discharge line being guided to outside the fluidized-bed reactor and the solids particle discharge line opening into the fluidization zone.

17. The apparatus as claimed in claim 10, wherein the feed device for supplying coarse-grained material comprises a pneumatic feed device.

18. A process for reducing the amount of gas which flows out of a separation chamber, in which solids are separated out of a gas by centrifugal-force deposition, and the at least partially cleaned gas is removed via at least one gas removal line, wherein the separation chamber has a deposition capacity which is lowered, as compared to standard operation, as a result of at least partial blockage by the deposited solids, the process comprising:
   at least partially sealing the gas removal lines which in normal operation has been at least partially cleaned in the separation chamber by introducing a coarse bulk material in sufficient amount into at least one of the separation chamber and the removal line for removing the gas.

19. The process as claimed in claim 18, wherein the gas is at least partially prevented from leaving the separation chamber via the gas removal line by a bed of bulk material which is caused by the introduction of the coarse bulk material.

20. The process as claimed in claim 19, wherein the coarse bulk material has a mean grain diameter selected to at least partially prevent an undesired discharge via the gas flow out of the separation chamber via the removal line.

21. An apparatus for cleaning a dust-laden gas, comprising:
a separation chamber in which a solids component can be at least partially separated from a gas phase of the gas using the principle of centrifugal-force deposition;
an inlet for the gas to be fed to the separation chamber; a line for removal of gas from the separation chamber for removing the at least partially cleaned gas;
a filling connection piece for introducing coarse bulk material via at least one of the line for removal of the at least partially cleaned gas and/or at the separation chamber;
a filter mechanism at which the coarse bulk material can be separated from the deposited dusts; and
an extracting device for extracting the coarse bulk material from the filter, the filter mechanism and the extracting device being arranged beneath the separation chamber.

22. The apparatus as claimed in claim 21, further comprising a device for metered supply of the coarse bulk material, and the filling connection piece being part of the metered supply device;
a controllable lock, or a controllable star feeder or another component for the metered supply of the bulk material at the metered supply device.

23. The apparatus as claimed in claim 22, wherein the metered supply device includes a vessel which can be coupled to the filling connection piece.

24. The process as claimed in claim 1, wherein the coarse-grained material is introduced into the stream of the fine particle material which is to be fed to the separation step so that the stream of the fine particle material is entrained with the treatment gas.

25. The process according to claim 1, further comprising introducing the coarse-grained material into the separation step.

26. The apparatus as claimed in claim 10, wherein the separating device comprises a cyclone.

27. The apparatus as claimed in claim 10, further comprising an additional inlet opening into the separating device for introducing coarse-grained material fed by the feed device.

28. The apparatus as claimed in claim 27, wherein the separating device comprises a cyclone, and the additional inlet opening is arranged such that coarse-grained material can be introduced into the cyclone substantially tangentially by the feed device.

29. The apparatus as claimed in claim 27, wherein the additional inlet opening is arranged such that coarse-grained material can be introduced into the separating device from above by the feed device for supplying coarse-grained material.

30. The process as claimed in claim 18, wherein the coarse bulk material has a mean grain diameter selected to at least partially prevent an undesired discharge via the gas flow out of the separation chamber via the removal line.

31. Apparatus for reduction treatment of material in particle form, the apparatus comprising:
a fluidized-bed reactor having an upper part and a lower part, with a fluidization zone in the lower part;
a deposition device connected to the fluidization zone for receiving treatment gas exiting from the fluidized-bed reactor having material in fine particle form entrained therein,
the deposition device comprising a separating unit in which the fine particle material can be separated from the treatment gas;
a feeder for feeding treatment gas and material in fine particle form into the separating unit;
a treatment gas discharge line, which leads out of the separating unit, and a solids particle discharge line which leads out of the separating unit;
a feed device for feeding coarse-grained material into the flow path of the treatment gas and/or fine particle material from the fluidization zone at one or more locations such that the coarse-grained material and the discharged fine particle material travel together in the solids particle discharge line.

32. The apparatus as claimed in claim 31, wherein the feed device for coarse-grained material comprises a lance which opens out into the interior of the separating unit for introducing coarse-grained material into the interior of the separating unit.

33. The apparatus as claimed in claim 32, wherein the feed device for coarse-grained material is connected to deliver the coarse-grained material into the feeder upstream of the separating unit.

34. The apparatus as claimed in claim 31, wherein the separating device comprises a cyclone, and an additional inlet opening is arranged such that coarse-grained material can be introduced into the cyclone substantially tangentially.

35. The apparatus as claimed in claim 31, wherein the feed device for the coarse-grained material is connected to the solids particle discharge line for introducing coarse-grained material into a stream of fine particle material which has been separated out in the separating unit.

36. The apparatus as claimed in claim 31, wherein the deposition device is arranged outside the fluidized-bed reactor, and comprises a further fluidized-bed reactor into which the solids particle discharge line opens out.

37. The apparatus as claimed in claim 31, wherein the deposition device is arranged inside the fluidized-bed reactor, the treatment-gas discharge line being guided to outside the fluidized-bed reactor and the solids particle discharge line opening into the fluidization zone.

38. The apparatus as claimed in claim 31, wherein the feed device for supplying coarse-grained material comprises a pneumatic feed device.

* * * * *